(12) United States Patent
Viault

(10) Patent No.: US 12,706,511 B2
(45) Date of Patent: Aug. 11, 2026

(54) ELECTRICAL MACHINE WITH A CONDUCTIVE SLEEVE

(71) Applicant: Aktiebolaget SKF, Gothenburg (SE)

(72) Inventor: Samuel Viault, Saint-Antoine-du-Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 507 days.

(21) Appl. No.: 18/103,628

(22) Filed: Jan. 31, 2023

(65) Prior Publication Data

US 2023/0261553 A1 Aug. 17, 2023

(30) Foreign Application Priority Data

Feb. 17, 2022 (FR) ...................................... 2201398

(51) Int. Cl.

*H02K 11/40* (2016.01)
*H01R 13/648* (2006.01)
*H01R 39/38* (2006.01)
*H02K 5/173* (2006.01)

(52) U.S. Cl.

CPC ........... *H02K 11/40* (2016.01); *H01R 13/648* (2013.01); *H01R 39/38* (2013.01); *H02K 5/173* (2013.01); *H01R 2201/10* (2013.01)

(58) Field of Classification Search

CPC ........ H02K 11/40; H02K 5/173; H02K 7/003; H02K 7/08; H02K 5/16; H01R 13/648; H01R 39/38; H01R 2201/10; H01R 39/64; F16C 19/06; F16C 2226/76; F16C 33/586; F16C 41/002

See application file for complete search history.

(56) References Cited

U.S. PATENT DOCUMENTS

2008/0258576 A1 10/2008 Oh et al.
2020/0263734 A1 8/2020 Kottapalli et al.
2022/0006367 A1 1/2022 Roman et al.
2022/0311315 A1* 9/2022 Lindener ................ H02K 7/003

FOREIGN PATENT DOCUMENTS

FR 2529022 A1 12/1983
WO 2019/051482 A1 3/2019
WO WO-2021219159 A1 * 11/2021
WO WO-2022234079 A1 * 11/2022 ............. H01R 39/12

OTHER PUBLICATIONS

English translation of FR-2529022-A1 (Year: 1983).*
English translation of WO-2021219159-A1 (Year: 2021).*
English translation of WO-2022234079-A1 (Year: 2022).*

* cited by examiner

*Primary Examiner* — Tulsidas C Patel
*Assistant Examiner* — Joshua Kiel M Rodriguez
(74) *Attorney, Agent, or Firm* — J-TEK LAW PLLC; Jeffrey D. Tekanic; Scott T. Wakeman

(57) ABSTRACT

An electrical machine providing a stationary part, a turning part, at least one bearing and an earthing fibre brush. The electrical machine having a conductive sleeve with an annular base made of an electrically conductive material, the annular base being fixed to the turning part or to a turning race of the bearing, and a conductive coating based on chromium nitride covering at least partly a surface of the base (21) so that the free end of the fibres is in sliding contact against the coating based on chromium nitride.

18 Claims, 7 Drawing Sheets

[Fig 1]
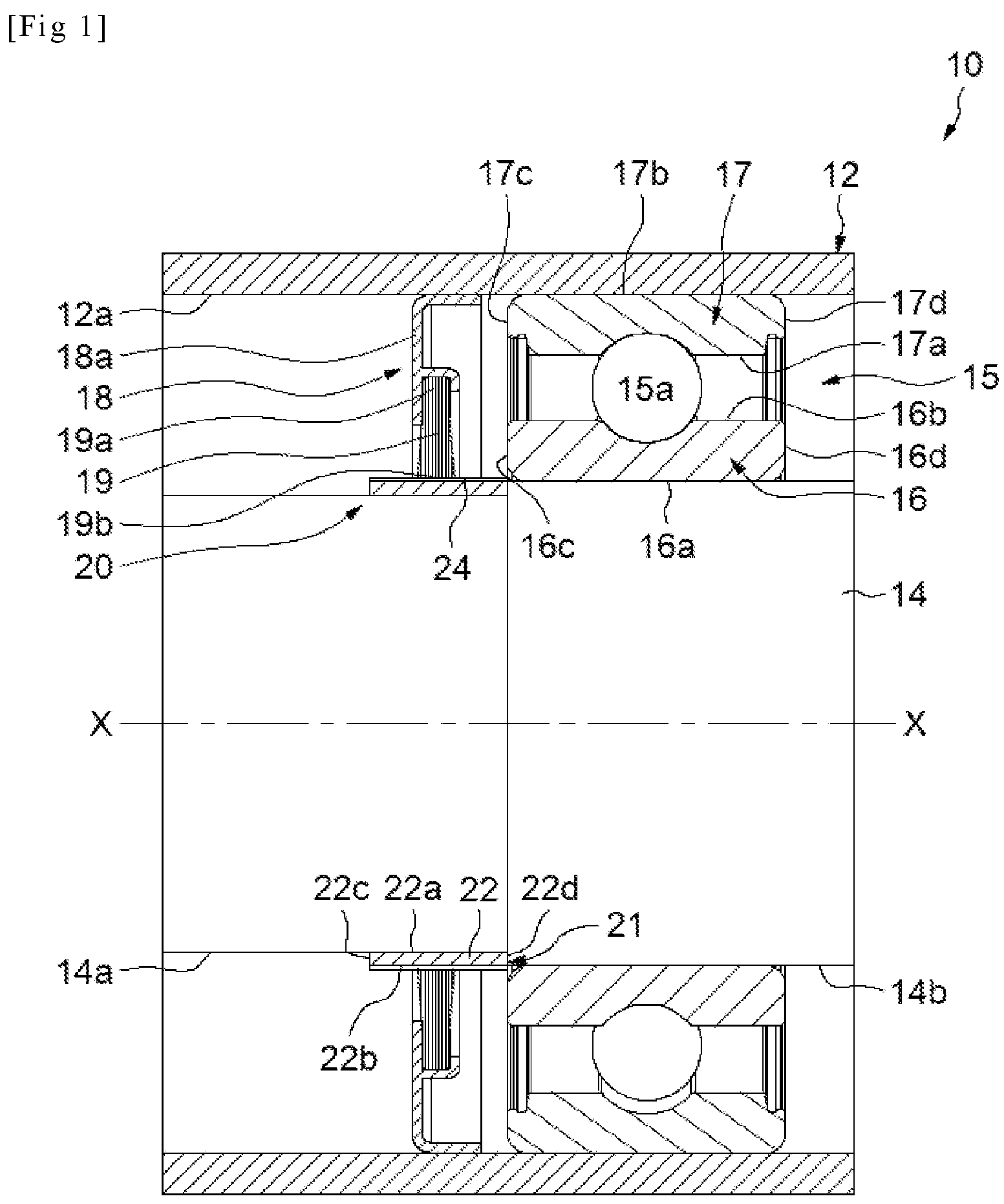

[Fig 2]
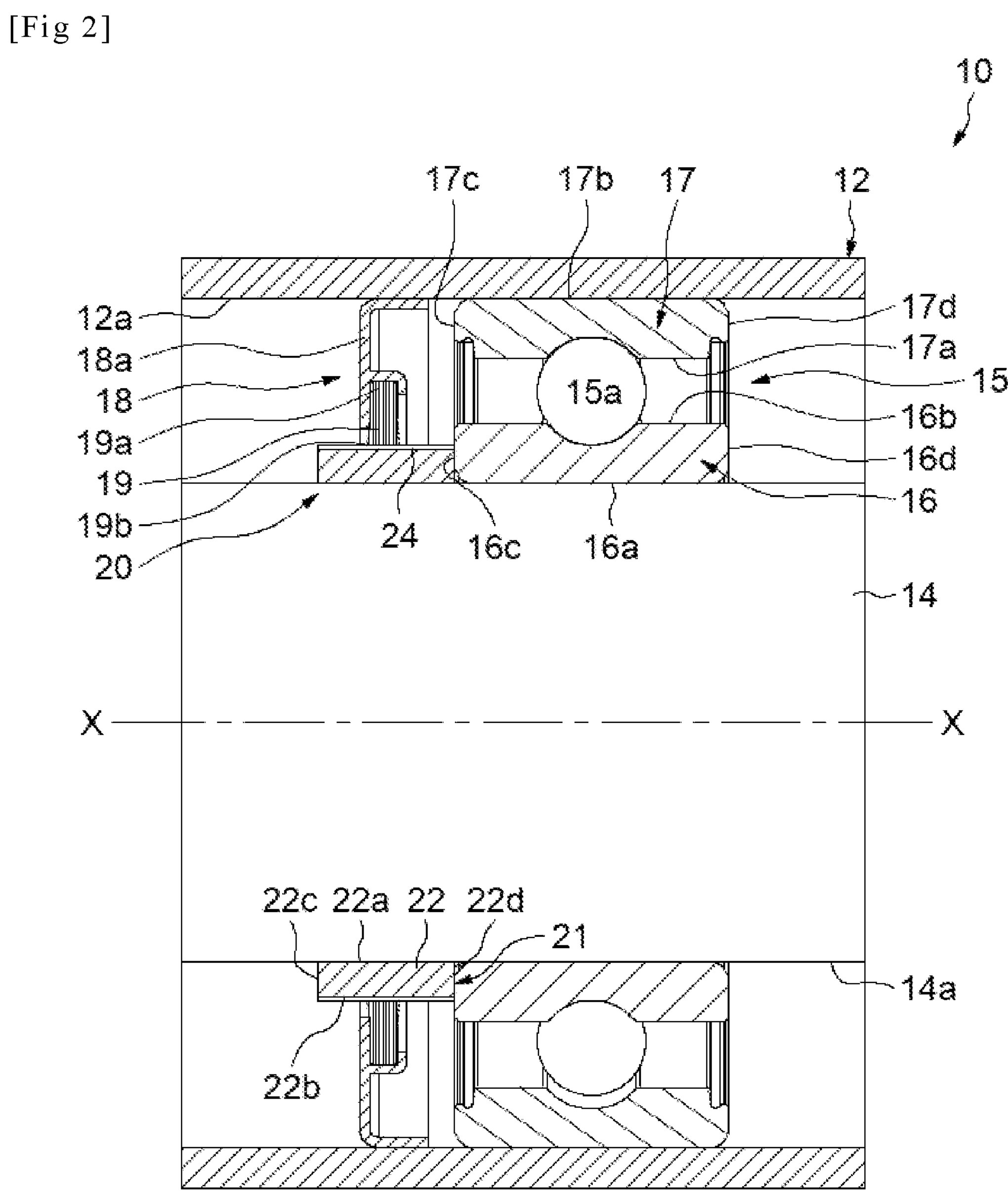

[Fig 3]
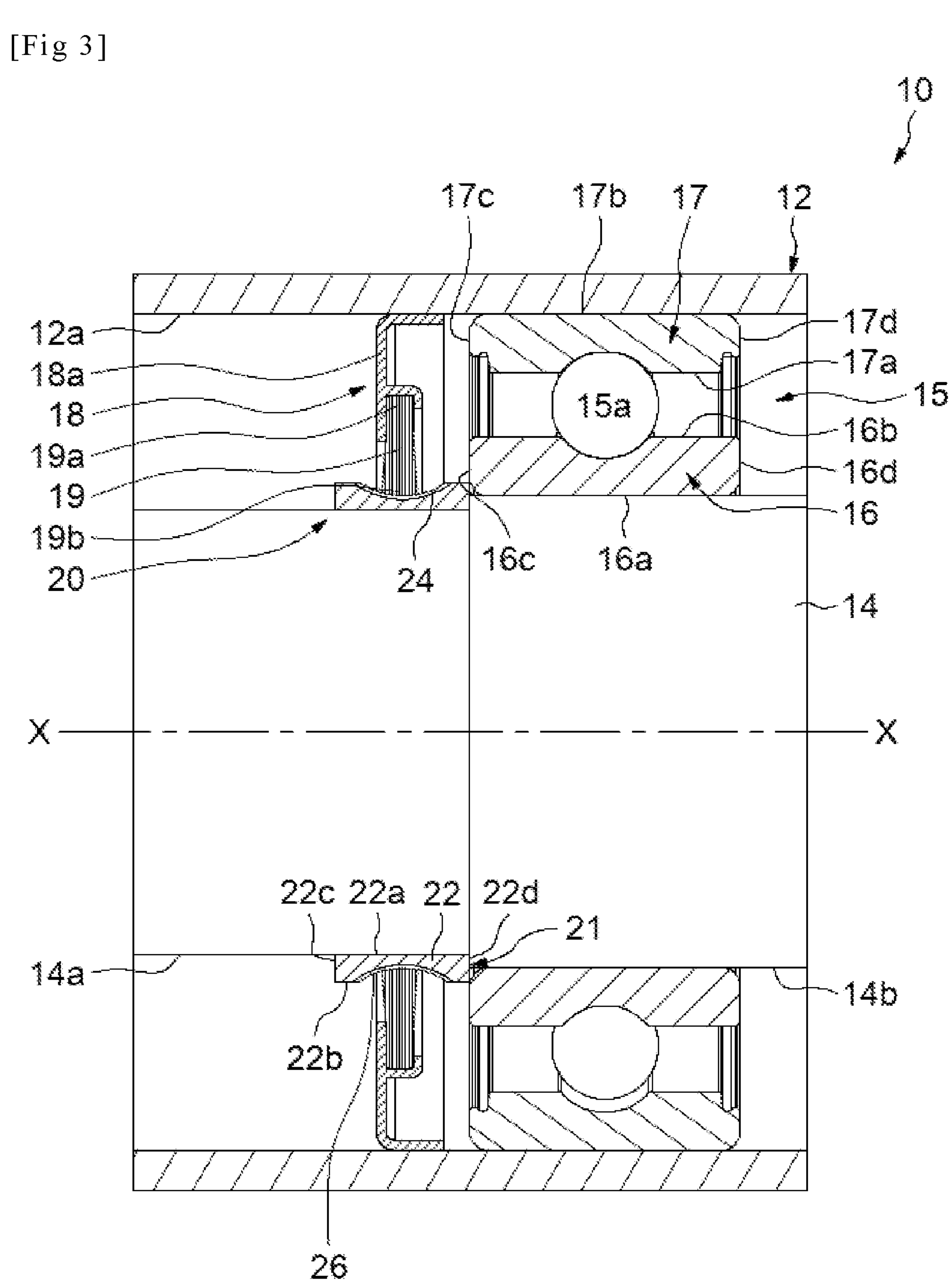

[Fig 4]
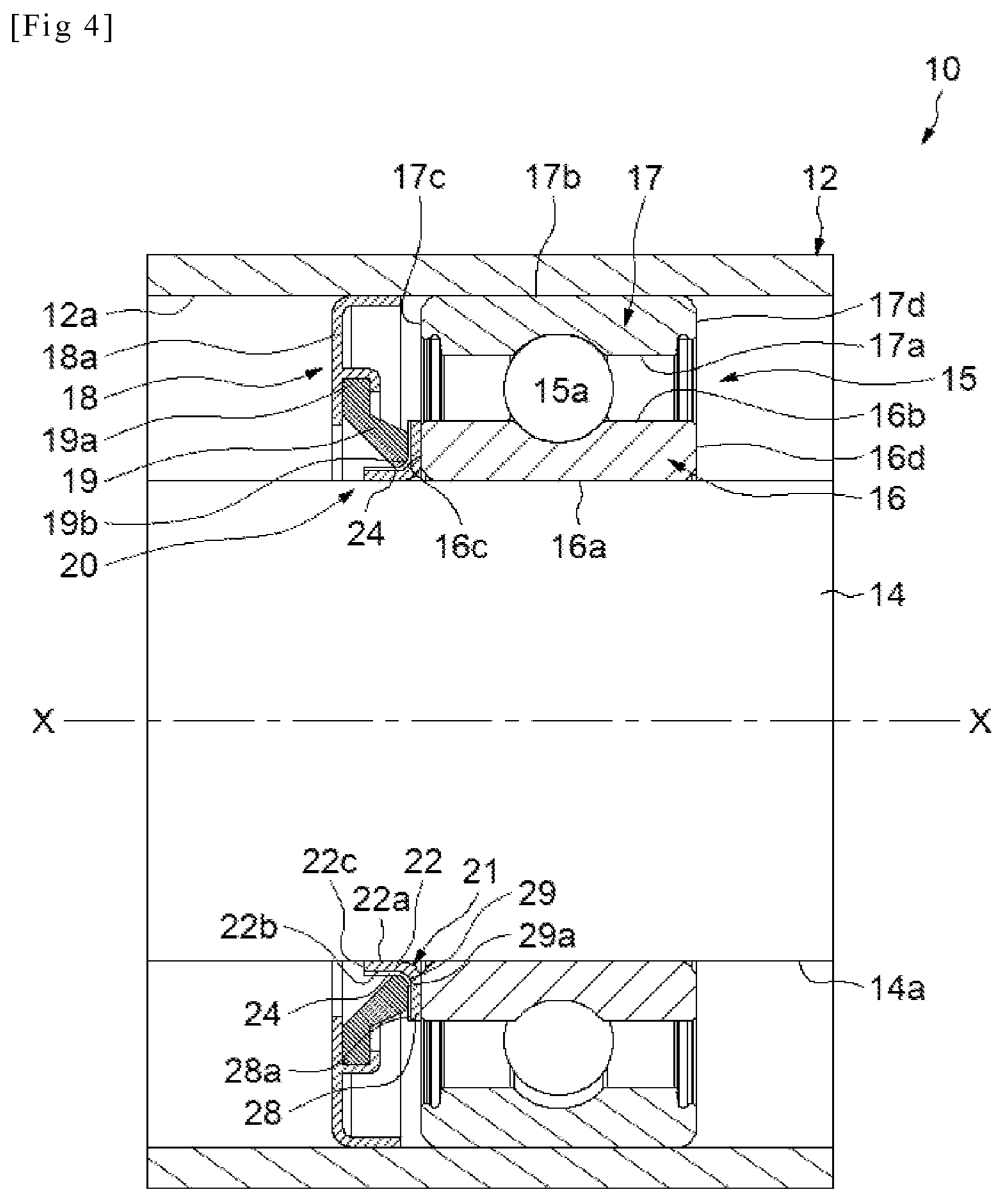

[Fig 5]
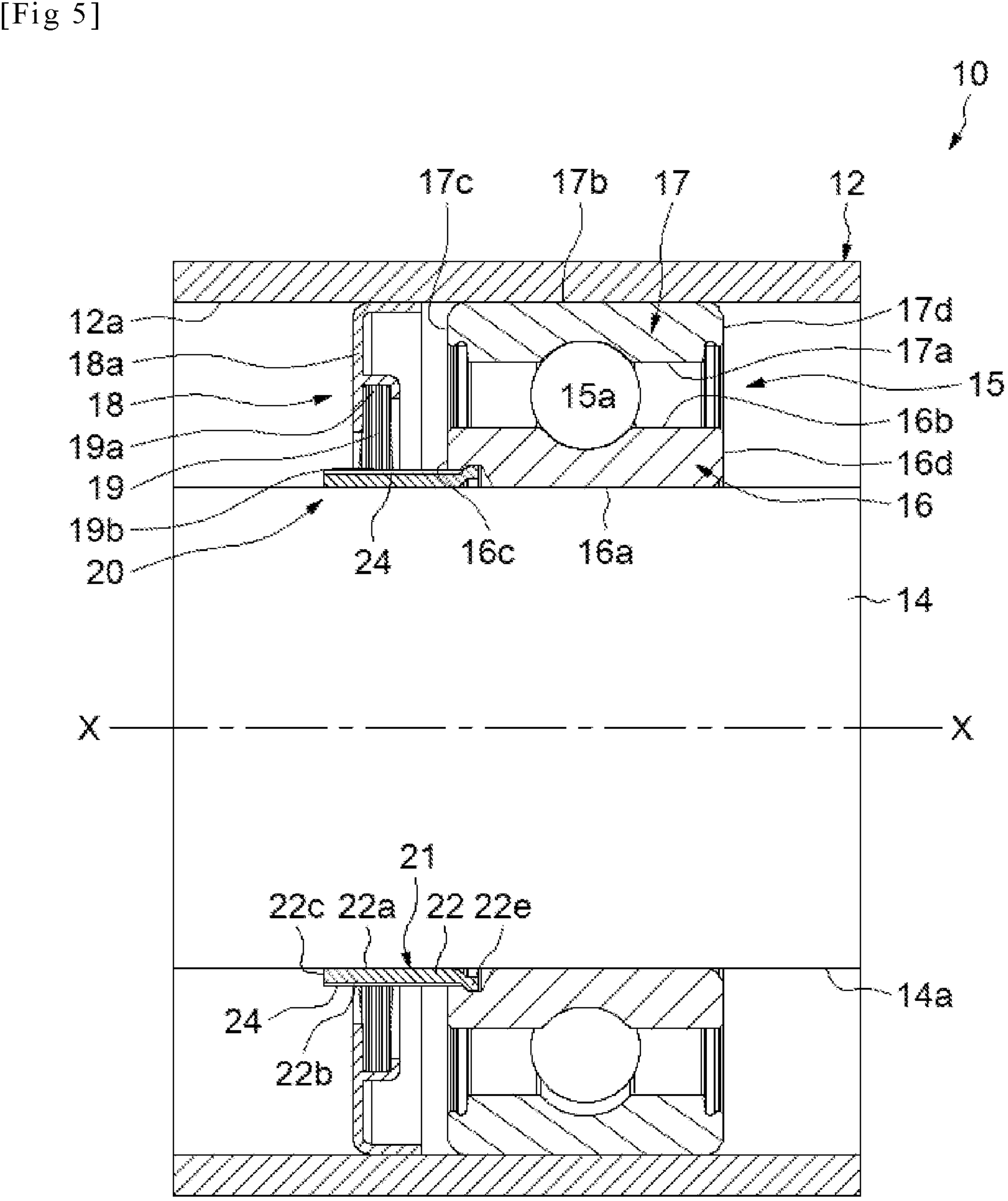

[Fig 6]

[Fig 7]
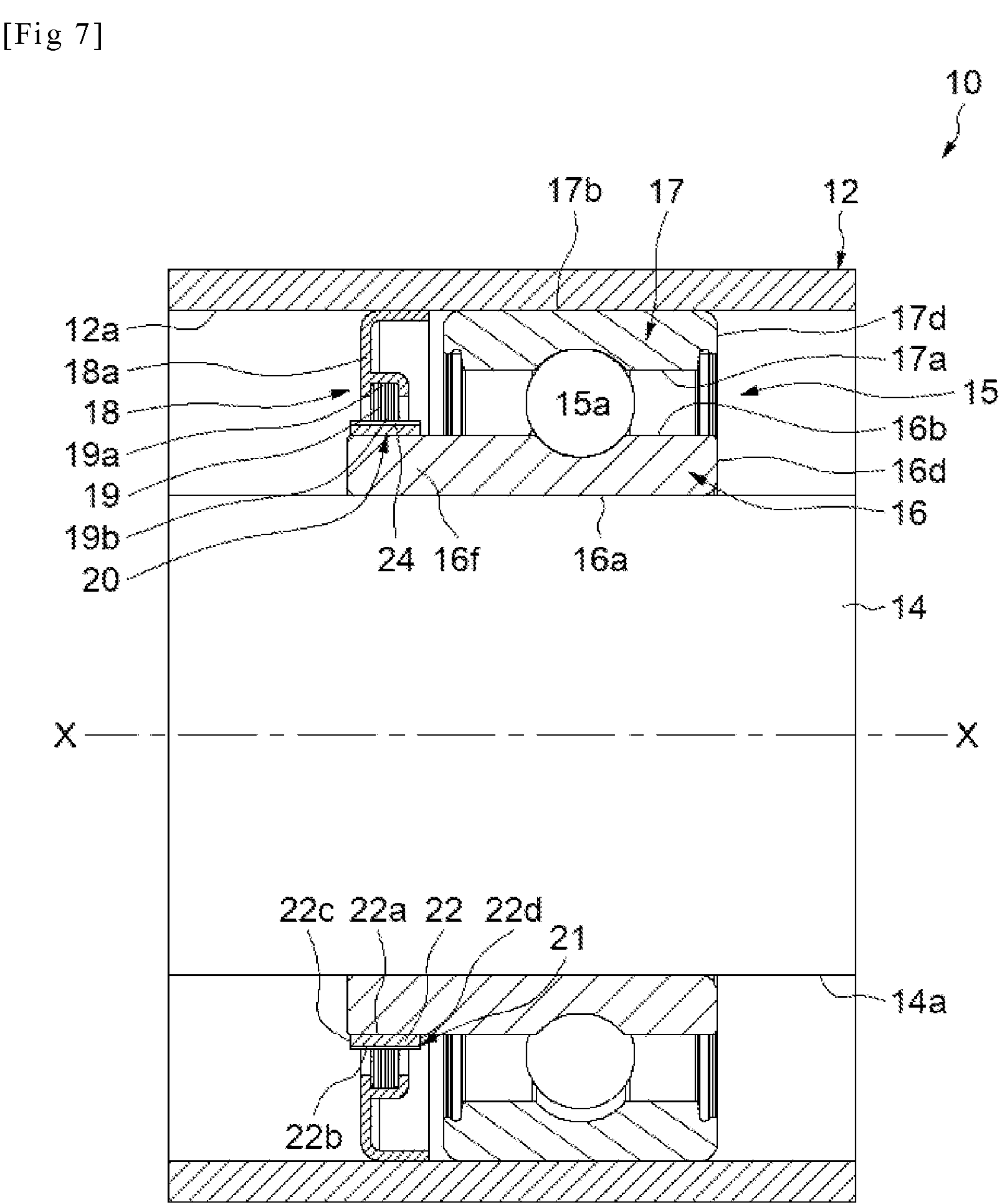

ELECTRICAL MACHINE WITH A CONDUCTIVE SLEEVE

CROSS-REFERENCE TO RELATED APPLICATION

This application claims priority to French Patent Application no. 2201398, filed on Feb. 17, 2022, the contents of which are fully incorporated herein by reference.

TECHNICAL FIELD

The present invention concerns the field of rotating electrical machines having an earthing (grounded) brush, in particular an earthing (grounded) fibre brush.

PRIOR ART

Rotating machines generally comprise a housing and a rotating shaft rotatably supported by at least one bearing. A bearing is generally provided with a turning (rotatable) race fastened to the turning (rotatable) shaft, a stationary race fastened to the housing and a plurality of rolling elements disposed between the races.

The electrical power supply of rotating machines generates an electrical potential difference between the shaft and the housing, thereby inducing an electrical potential difference between the race of the bearing connected to the shaft and the race of the bearing connected to the frame of the machine. This potential difference between the races of the bearing can lead to a discharge of electrical current across the bearing.

The electrical current passing across the bearing may damage the raceways and the rolling elements. The electrical discharges can also create vibrations that increase the acoustic noise of the machine.

It is known to earth (ground) a rotating shaft using an earthing (ground) brush. It is particularly advantageous to design a brush with conductive fibres. The earthing brush is typically mounted on the frame of a machine so that the ends of the fibres come into radial contact against an exterior surface of the rotating shaft.

The conductivity of the fibres creates a parallel electrical circuit and thus enables the shaft to be maintained at the same electrical potential as the frame of the machine. This also enables the races of the bearing to be maintained at the same electrical potential and significantly reduces electrical discharges across the bearing.

However, even with this kind of earthing brush, the electrical resistance of the shaft increases over time because of a change to the surface of the shaft. In fact, during the service life of the machine, the exterior surface of the shaft can oxidise because, for example, of moisture, heat, electrical current and/or friction.

Because of this change of state of the surface of the shaft, the earthing brush will have a higher resistance and a higher breakdown voltage than the bearing and will no longer be able to create a parallel electrical circuit. The current will then again cross the bearing and considerably damage it.

There is therefore a need to protect the exterior surface of the rotating shaft in such a manner as to prevent any change of state of that surface during the service life of the machine.

In order to reduce the risk of oxidation of the exterior surface of the shaft and therefore to maximise its conductivity, it is known to apply a coating based on resin, such as an epoxy resin, to the exterior surface of the shaft. However, this kind of coating has a low hardness and may be rapidly damaged or even detached by the sliding contact of the fibres of the earthing brush.

The present invention aims to improve the protection of the sliding surface of the rotating shaft.

SUMMARY OF THE INVENTION

In one aspect of the present teachings, an electrical machine comprises a stationary part, a turning part, at least one bearing rotatably supporting the turning part and an earthing (grounded) fibre brush. The bearing comprises a turning race fixed to the turning part and a stationary race fixed to the stationary part. The earthing fibre brush comprises a support fixed to the stationary part or to the stationary race and a plurality of conductive fibres, a first end of which is fixed to the support and a free second end of which is opposite the first end and extends toward the turning part.

In accordance with the present teachings, the electrical machine also comprises a conductive sleeve. The conductive sleeve comprises an annular base formed of an electrically-conductive material, the annular base being fixed to the turning part or to the turning race of the bearing. The conductive sleeve also comprises a conductive coating based on chromium nitride (CrN) at least partly covering a surface of the base facing the free second end of the conductive fibres of the earthing fibre brush so that the free second end of the fibres is in sliding contact against the coating based on chromium nitride.

The conductive sleeve forms a sliding surface for the conductive fibres of the earthing brush. This sleeve is therefore integrated into the exterior surface of the turning part of the electrical machine. The conductive sleeve enables a durable minimum contact electrical resistance.

The coating based on chromium nitride with which the sliding surface is provided has a high hardness. The coating will therefore neither be detached by the free ends of the fibres in sliding contact during the service life of the electrical machine nor even degraded. This prevents all oxidation or change of state of the sliding contact surface over time.

Moreover, the coating based on chromium nitride is also an excellent electrical conductor which in combination with the conductive material forming the annular base produces the electrical conductivity of the sleeve. The combination of the earthing fibre brush and the conductive sleeve provided with a conductive material base and a sliding contact surface for the fibres coated with a layer based on chromium nitride creates a durable parallel electrical circuit. A design of this kind therefore enables the turning part to be maintained at the same electrical potential as the stationary part during the service life of the electrical machine.

In accordance with advantageous but not obligatory aspects of the present teachings, this kind of electrical machine may have one or more of the following features in any technically permissible combination:

The thickness of the coating based on chromium nitride is between 1 and 3 μm inclusive, and preferably equal to 2 μm.

The hardness of the coating based on chromium nitride is between 15 and 20 GPa inclusive.

The coating based on chromium nitride contains silver (Ag).

The proportion of chromium nitride in the coating is between 30 and 40% inclusive.

The coating based on chromium nitride is applied to the annular base of the conductive sleeve by a vacuum deposition process. For example, the deposition process used is a physical vapour deposition (PVD) process.

The coating based on chromium nitride is applied to the annular base of the conductive sleeve by a plasma assisted chemical vapour deposition (PACVD) process.

The annular base of the conductive sleeve comprises an annular ring fixed to the turning part or to the turning race of the bearing.

The annular ring comprises a sliding contact surface for the free second end of the fibres of the earthing brush and at least the sliding contact surface of the annular ring is provided with the coating based on chromium nitride.

The annular ring is tight fit on a cylindrical exterior surface of the turning part.

In the alternative, the annular ring is tight fit on a cylindrical surface of the turning race.

The turning part comprises a shoulder against which the annular ring of the conductive sleeve comes to bear (axially contacts).

The annular ring of the conductive sleeve comes to bear against (axially contacts) a front (axial) surface of the turning race of the bearing. In this embodiment the conductive sleeve forms both a sliding contact surface for the fibre brush and a spacing means for the bearing.

The annular ring of the sleeve comprises a toroidal track (circumferentially-extending, curved groove) inside which the fibres of the brush come to extend, the free second end of the fibres of the brush coming into sliding contact against the toroidal track. At least the toroidal track is provided with the coating based on chromium nitride.

The base of the conductive sleeve further comprises a radial portion extending radially from the annular ring in the direction of the stationary part.

The radial portion of the conductive sleeve comes to bear axially against (axially contacts) the turning race of the bearing.

The radial portion of the conductive sleeve comes to bear axially against (axially contacts) a shoulder on the turning part.

The annular ring and the radial portion are connected by a curved portion.

The free second end of the fibres of the brush comes into sliding contact against the curved portion and at least the curved portion is provided with the coating based on chromium nitride.

The fibres of the brush extend in a direction inclined toward the curved portion.

The free second end of the fibres of the brush comes into sliding contact against the radial portion, and at least the radial portion is provided with the coating based on chromium nitride.

The annular ring of the conductive sleeve comprises at least one retaining rib extending radially from a lateral face of the annular ring in the direction of the stationary part, the retaining rib cooperating mechanically with a groove on a surface of the turning race of the bearing.

The retaining rib is annular.

The annular ring comprises a plurality of retaining ribs distributed circumferentially.

The annular base of the conductive sleeve comprises an annular washer extending radially, the washer coming to bear axially against (axially contacting) a front (axial) surface of the turning race of the bearing, and an axial rim extending axially from one edge of the washer, the rim coming to bear radially on (radially contacting) the turning race of the bearing.

The axial rim is tight fit on the turning race of the bearing.

The free second end of the fibres of the brush comes into sliding contact against the annular washer, and at least the annular washer is provided with the coating based on chromium nitride.

The annular base is entirely covered by the coating based on chromium nitride.

The annular base is made of metal. For example: steel, stainless steel, brass, copper, copper alloy, aluminium, or aluminium alloy.

The fibres of the brush extend in a direction inclined toward the coating based on chromium nitride.

The bearing comprises a plurality of rolling elements arranged between the races.

The bearing is a smooth bearing.

The turning part of the electrical machine is a shaft and the stationary part is a housing.

The turning race of the bearing is an inner race and the stationary race is an outer race.

BRIEF DESCRIPTION OF THE FIGURES

The present invention will be better understood after studying—the detailed description of embodiments chosen by way of non-limiting examples and illustrated in the appended drawings, in which: At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention will be better understood after studying the detailed description of embodiments chosen by way of non-limiting example and illustrated by the appended drawings, in which:

FIG. 1 is a diagrammatic view in section of an electrical machine provided with a conductive sleeve in accordance with a first embodiment of the present teachings;

FIG. 2 is a diagrammatic view in section of an electrical machine provided with a conductive sleeve in accordance with a second embodiment of the present teachings;

FIG. 3 is a diagrammatic view in section of an electrical machine provided with a conductive sleeve in accordance with a third embodiment of the present teachings;

FIG. 4 is a diagrammatic view in section of an electrical machine provided with a conductive sleeve in accordance with a fourth embodiment of the present teachings;

FIG. 5 is a diagrammatic view in section of an electrical machine provided with a conductive sleeve in accordance with a fifth embodiment of the present teachings;

FIG. 6 is a diagrammatic view in section of an electrical machine provided with a conductive sleeve in accordance with a sixth embodiment of the present teachings; and FIG. 7 is a diagrammatic view in section of an electrical machine provided with a conductive sleeve in accordance with a seventh embodiment of the present teachings.

DETAILED DESCRIPTION OF THE INVENTION

Persons of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In the following description the terms "outer" and "inner" are referred to a rotation axis X-X of a turning part 14 of an electrical machine 10, inner parts being closer to the axis than outer parts.

Referring to FIG. 1, an electrical machine 10 in accordance with a first embodiment of the present teachings comprises a stationary housing 12, a rotating shaft 14, a bearing 15 rotatably supporting the shaft 14 and an earthing (grounded) fibre brush 18 mounted in the housing 12.

Here the electrical machine 10 is illustrated with a single bearing 15. As an alternative, the electrical machine may comprise a plurality of bearings.

The electrical machine 10 is illustrated with a turning part formed by a shaft and a stationary part formed by a housing. As an alternative, the shaft may be a stationary part and the housing may be a turning part.

As illustrated in FIG. 1, the rotating shaft 14 has a staggered (stepped) cylindrical outer surface with a smaller diameter section 14*a*, a larger diameter section 14*b* and a radially-extending shoulder (not numbered) therebetween. The bearing 15 is mounted radially between an inner surface or bore 12*a* of the housing 12 and the larger diameter section 14*b* of the rotating shaft 14. The bore 12*a* of the housing 12 may comprise shoulders or axial retaining means in such a manner as to retain the bearing 15 axially inside the housing 12.

In accordance with one embodiment of the present teachings given by way of non-limiting example, the bearing 15 comprises a turning (rotatable) inner race 16, a stationary outer race 17 and a range (series) of rolling elements 15*a*, here balls, arranged between the races 16, 17. The bearing 15 may further comprise a cage (not illustrated here) to retain the rolling elements 15*a* circumferentially. As an alternative, the bearing may comprise a plurality of rows of rolling elements. As an alternative, the bearing may comprise other types of rolling elements, such as rollers or tapered rollers. As an alternative, the bearing may consist of a smooth bearing. As an alternative, in the situation where the shaft 14 is stationary and the housing 12 rotates, the inner race 16 may be a stationary race and the outer race 17 may be a turning race.

The inner race 16 and the outer race 17 are concentric races capable of relative rotation about the rotation axis X-X of the bearing 15, the outer race 17 radially surrounding the inner race 16.

As illustrated in FIG. 1, the inner race 16 of the bearing 15 is of a solid type and is delimited radially by a cylindrical inner surface or bore (radially innermost surface) 16*a* in radial contact with the shaft 14 and a cylindrical outer surface 16*b* provided with a raceway for the rolling elements 15*a*. The inner race 16 further comprises two opposite radial front faces 16*c*, 16*d* that delimit axially the inner cylindrical surface 16*a* and the outer cylindrical surface 16*b*. The inner race 16 is fastened to the shaft 14 and supports the rotational movement of the shaft 14.

As illustrated, the outer race 17 of the bearing 15 is of a solid type and is delimited radially by a cylindrical inner surface 17*a* provided with a raceway for the rolling elements 15*a* and a cylindrical outer surface 17*b* in radial contact with the inner surface 12*a* of the housing 12. The outer race 17 further comprises two opposite radial front faces 17*c*, 17*d* that delimit axially the cylindrical inner surface 17*a* and the cylindrical outer surface 17*b*. The outer race 17 is fastened to the housing 12 and is stationary.

The earthing fibre brush 18 comprises a support 18*a* and a plurality of conductive fibres 19 having a first end 19*a* fixed to the support 18*a* and a free second end 19*b* opposite the first end and extending essentially radially toward the shaft 14.

The support 18*a* is fixed in the housing 12, for example by a tight fit in the inner surface 12*a* or by any other retaining or adhesive means. As an alternative, the support 18*a* may be fastened to the bearing 15, for example to the outer race 17.

In accordance with a preferred embodiment, the conductive fibres 19 are carbon fibres.

In accordance with the present embodiment, the machine 10 further comprises a conductive sheath 20 forming a sliding surface for the free end 19*b* of the fibres 19 of the earthing brush 18.

In accordance with the first embodiment illustrated in FIG. 1, the conductive sleeve 20 comprises a base 21 having an annular ring 22 that is tight fit on the smaller-diameter section 14*a* of the rotating shaft 14, such that the radially innermost surface 22*a* of the conductive sleeve 20 is located radially inwardly from the radially innermost surface 16*a* of the inner race 16, as can be seen in FIG. 1.

More specifically, the annular ring 22 is delimited radially by the cylindrical inner (radially innermost) surface 22*a*, which is in radial contact with the larger-diameter section 14*b* of the shaft 14, and a cylindrical outer surface 22*b*. The annular ring 22 is fastened to the shaft 14 and rotates together with the shaft 14. The annular ring 22 is delimited axially by two radially-extending end surfaces 22*c*, 22*d* that delimit axially the cylindrical inner surface 22*a* and the cylindrical outer surface 22*b*.

One of the radially-extending end surfaces 22*d* comes to bear axially against (axially contacts) the shoulder between the smaller diameter section 14*a* and the larger diameter section 14*b* of the shaft 14. The axial position of the sleeve 20 is therefore defined by this shoulder.

The base 21 of the conductive sleeve is formed of an electrically-conductive material, preferably a metal. For example, the base 21 is formed of steel, stainless steel, brass, copper, copper alloy, aluminium, aluminium alloy or any other metal suitable for this application.

In accordance with a particularly advantageous aspect of the invention, at least the cylindrical outer surface 22*b* of the ring 22 of the conductive sleeve 20 is covered by a coating 24 based on chromium nitride (CrN).

In the example illustrated in FIG. 1, only the cylindrical outer surface 22*b* of the annular ring 22 of the base 21 is covered entirely by the coating 24 based on chromium nitride. In accordance with a variant that is not illustrated, the coating 24 based on chromium nitride may also cover at least in part one of the other surfaces of the annular ring 22, namely the cylindrical inner surface 22*a* mounted on the shaft 14, the free radial front surface 22*c*, and the radial front surface 22*d* bearing against the shoulder 14*b*. All the outer surfaces of the ring 22 of the base 21 may be covered by the coating 24 based on chromium nitride. In all cases the coating 24 based on chromium nitride faces the free end 19*b* of the conductive fibres 19 of the earthing brush 18 and the coating 24 forms a sliding contact surface for the fibres 19. The free end 19*b* of the fibres 19 comes into sliding contact against the outer surface formed by the coating 24 based on chromium nitride on the cylindrical outer surface 22*b* of the base 21 of the conductive sleeve 20.

The thickness of the coating 24 based on chromium nitride is between 1 and 3 μm inclusive and preferably equal to 2 μm.

The hardness of the coating 24 based on chromium nitride is between 15 and 20 GPa inclusive.

In accordance with a variant the coating 24 based on chromium nitride may contain silver (Ag). The proportion of chromium nitride in the coating is advantageously between 30 and 40% inclusive.

The coating 24 based on chromium nitride is applied to the annular base 21 of the conductive sleeve 20 by a vacuum deposition process. For example, the deposition process used is a physical vapour phase deposition (PVD) process. In accordance with a variant, the coating 24 based on chromium nitride may be applied to the annular base 21 of the conductive sleeve 20 by a plasma-assisted chemical vapour deposition (PACVD) process.

The coating 24 based on chromium nitride has a high hardness. Applied to the cylindrical outer surface 22*b*, the coating 24 forms a barrier against contact wear caused by the free end 19*b* of the fibres 19 rubbing. The outer surface 14*a* of the rotating shaft is therefore protected against oxidation and abrasion. The coating 24 based on chromium nitride is not degraded by the fibres 19 and assures the sliding contact surface function throughout the service life of the electrical machine 10.

Moreover, the coating 24 based on chromium nitride is electrically conductive. In combination with the conductive material of the base 21 of the conductive sleeve 20, this coating 24 assures the passage of electrical current between the stationary housing 12 on the one hand and the rotating shaft 14 on the other hand. The housing 12 and the shaft 14 are at the same electrical potential, likewise the outer race 17 fastened to the housing 12 and the inner race 16 fastened to the shaft 14. This greatly reduces the risk of electrical discharge and of associated wear.

The combination of these technical features to form this kind of conductive sleeve 20 enables optimum passage of electrical current between the housing 12 and the shaft 14 via the earthing fibre brush 18 throughout the service life of the electrical machine 10.

A second embodiment of the present teachings is illustrated in FIG. 2 and is distinguished from the preceding embodiment in that one of the radial front surfaces 22*d* of the annular ring 22 of the base 21 of the conductive sleeve 20 comes into axial contact against one of the radial front surfaces 16*c* of the inner race 16 of the bearing 15.

In the example illustrated in FIG. 2, the annular ring 22 is thicker than that illustrated in FIG. 1. This kind of structure of the annular ring 22 enables it to withstand high axial loads, depending on the requirements of the application. The conductive sleeve 20 forms both a sliding contact surface for the brush 18 and an axial spacing means for the bearing 15.

The annular ring 22 is made of a conductive material, preferably a metal. The cylindrical outer surface 22*b* of the ring 22 is covered by a coating 24 based on chromium nitride. The free end 19*b* of the fibres 19 of the earthing brush 18 comes into radial sliding contact with the coating 24 of the conductive sleeve 20.

A third embodiment is illustrated in FIG. 3 and is distinguished from the first embodiment in that the outer surface 22*b* of the ring 22 comprises a toroidal track 26, i.e. a circumferentially-extending, curved groove.

The toroidal track 26 is covered by the coating 24 based on chromium nitride. In the example illustrated in FIG. 3 only the toroidal track 26 is covered by the coating 24. In accordance with a variant, all of the outer surface 22*b* including the toroidal surface 26 is covered by the coating 24. In accordance with a further variant, all of the surfaces of the ring 22 are covered by the coating 24.

The free ends 19*b* of the fibres 19 of the earthing brush 18 are contained in the hollow formed by the toroidal track 26 in such a manner as to maximise the contact of the fibres with the toroidal track 26 covered with the coating 24 based on chromium nitride. The axial movement of the fibres 19 is therefore limited.

A fourth embodiment is illustrated in FIG. 4 and is distinguished from the preceding embodiments by the general shape of the base 21 of the conductive sleeve 20.

The conductive sleeve 20 comprises an annular base 21 fixedly mounted on the outer surface 14*a* of the rotating shaft 14. The base 21 comprises an annular ring 22 having a cylindrical shape that extends axially. The base 21 further comprises a radial portion 28 extending radially outward from an axial side of the ring 22 in the direction of the housing 12. The ring 22 and the radial portion 28 are connected by a curved portion 29 in such a manner that the base 21 is formed in one piece.

The annular ring 22 of the conductive sleeve 20 is fixedly mounted on the outer surface 14*a* of the rotating shaft 14. The ring 22 is preferably a tight fit on the outer surface 14*a* of the rotating shaft 14.

The radial portion 28 of the conductive sleeve 20 is mounted so as to bear axially against a radial front surface 16*c* of the inner race 16 of the bearing 15. In accordance with a variant that is not illustrated, the radial portion 28 may come to bear axially against a shoulder on the outer surface 14*a* of the shaft 14.

As illustrated in FIG. 4, the outer surface of the base 21, namely the surface formed by the outer surface 22*b* of the ring 22, the outer surface 28*a* of the radial portion 28 and the outer surface 29*a* of the curved portion 29, is covered by a coating 24 based on chromium nitride. In accordance with a variant that is not illustrated, only the outer surface 29*a* of the curved portion 29, that is to say the surface opposite the surface facing the inner race 16 and the shaft 14, is covered by the coating 24.

The free end 19*b* of the conductive fibres 19 of the earthing brush 18 comes into sliding contact against the outer surface 29*a* of the curved portion 29. In a particularly advantageous manner, the conductive fibres 19 of the brush 18 extend in a direction inclined in the direction of the curved portion 29 and the free end 19*b* of the fibres 19 comes into radial and axial contact against the coating 24 of the conductive sleeve 20, i.e. by contacting the radially-extending, axial end surface 16*c* of the inner race 16. That is, as can be seen in FIG. 4, the fibres 19 extend at an angle to the longitudinal direction X of the shaft 14 and to a radial direction that is perpendicular to the longitudinal direction X. In addition, the location at which the fibres 19 are attached to the support is disposed axially forward of the location at which the fibres 19 contact the outer surface 29*a*.

In accordance with a variant, the fibres 19 come into sliding radial contact only on the outer surface 22*b* of the annular ring 22 of the base 21. In this case only the outer surface 22*b* of the annular ring 22 is provided with the coating 24. In accordance with another variant the fibres 19 come into sliding axial contact only on the outer surface 28*a* of the radial portion 28 of the base 21. In this case only the outer surface 28*a* of the radial portion 28 is provided with the coating 24.

A fifth embodiment in which the annular ring 22 comprises a retaining rib 22*e* is illustrated in FIG. 5.

The retaining rib 22*e* extends radially outwards from a radial front surface 22*d* of the annular ring 22. The retaining rib 22*e* cooperates with an inner groove 16*e* on the inner surface 16*a* of the inner race 16 of the bearing 15. The retaining rib 22*e* is therefore housed in the corresponding groove 16*e* of the inner race 16 and thus provides mechanical axial retention of the conductive sleeve 20. Mounting the sleeve 20 by clipping it onto the retaining rib 22*e* is a simplified solution with no necessity for retention by a tight fit of the base 21 of the sleeve 20.

The retaining rib 22*e* may be annular. As an alternative, the ring 22 may comprise a plurality of retaining ribs 22*e* distributed circumferentially on the radial front surface 22*d*.

Figure 6:
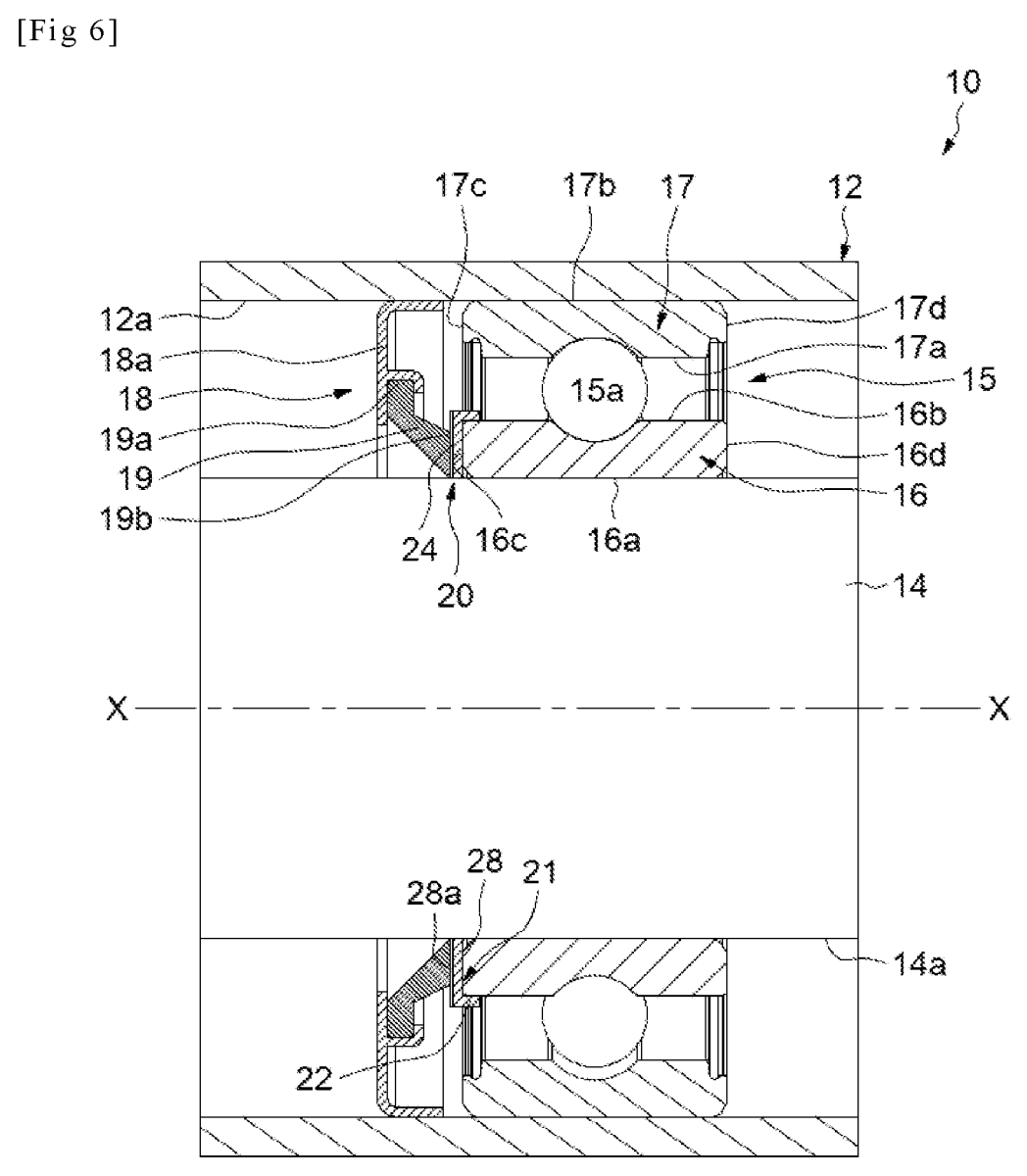

In a sixth embodiment of the present teachings illustrated in FIG. 6, the base 21 of the conductive sleeve 20 comprises an annular washer 28 extending radially, the washer 28 coming to bear axially against (axially contacts) a front (axial) surface 16*c* of the inner race 16 of the bearing 15. That is, the washer 28 includes a radially-extending (front) surface 28*a* that contacts the radially-extending (front) surface 16*c* of the inner race 16. The base 21 further comprises an axially-extending ring 22 extending axially from a radially outer edge of the radially-extending (front) surface 28*a* of the washer 28, the rim 22 coming to bear radially on (radially contacting) the cylindrical outer surface (axially-extending surface) 16*b* of the inner race 16 of the bearing 15.

The axial rim 22 is advantageously in a tight fit on the cylindrical outer surface 16*b* of the inner race 16.

The front surface 28*a* of the washer 28 is advantageously covered by a coating 24 based on chromium nitride. The free second end 19*b* of the conductive fibres 19 of the earthing brush 18 comes into sliding contact against the coating 24 on the radially-extending (front) surface 28*a* of the annular washer 28.

In a particularly advantageous manner, the conductive fibres 19 of the brush 18 extend in a direction inclined in the direction of the washer 28 and the free end 19*b* of the fibres 19 comes into axial contact against the coating 24 on the radially-extending (front) surface 28*a*. That is, similar to the embodiment of FIG. 4, the fibres 19 extend at an angle to the longitudinal direction X of the shaft 14 and to a radial direction that is perpendicular to the longitudinal direction X, as can be seen in FIG. 6. In addition, the location at which the fibres 19 are attached to the support is disposed axially forward of the location at which the fibres 19 contact the radially-extending (front) surface 28*a*.

This kind of configuration of the conductive sleeve 20 makes possible a compact structure of the electrical machine 10.

In a seventh embodiment of the invention illustrated in FIG. 7, the inner race 16 of the bearing 15 comprises an axial portion 16*f* that extends axially beyond the radial front face 17*c* of the outer race 17, the conductive sleeve 20 being mounted on the axial portion 16*f*.

The conductive sleeve 20 comprises an annular ring 22. The annular ring 22 comprises a cylindrical inner surface 22*a* that is a tight fit on the outer surface of the axial portion 16*f* of the inner race 16.

The free end 19*b* of the conductive fibres 19 of the earthing brush 18 is in sliding radial contact on the coating 24 covering the cylindrical exterior surface 22*b* of the ring 22. As an alternative, all of the ring 22 is covered with the chromium nitride coating 24.

In all of the embodiments described hereinabove, the base 21 of the conductive sleeve is made of an electrically conductive material, preferably a metal. For example, the base 21 is made of steel, stainless steel, brass, copper, copper alloy, aluminium, aluminium alloy, or any other metal suitable for the application.

In all of the embodiments described hereinabove, the thickness of the coating 24 based on chromium nitride is between 1 and 3 μm inclusive and preferably equal to 2 μm and the hardness of the coating 24 based on chromium nitride is between 15 and 20 GPa inclusive. In accordance with a variant, the coating 24 based on chromium nitride may contain silver (Ag). The proportion of chromium nitride in the coating is advantageously between 30 and 40% inclusive.

The embodiments described hereinabove are non-limiting examples of the present teachings and relate to an electrical machine 10 in which the shaft is the turning part and the housing is the stationary part. However, the invention also concerns embodiments in which the shaft is the stationary part and the housing is the turning part. As a general rule, the earthing fibre brush is fixed to the stationary part or the stationary race of the bearing and the conductive sleeve according to the invention is fixed to the turning part or the turning race of the bearing.

The invention claimed is:

1. An electrical machine comprising:

a stationary part, a turning part having a stepped cylindrical surface with a smaller diameter section, a larger diameter section and a shoulder therebetween, at least one bearing rotatably supporting the turning part, the bearing comprising a turning race fixed to the larger diameter section of the turning part and a stationary race fixed to the stationary part, an earthing fibre brush comprising a support fixed to the stationary part or to the stationary race, and a plurality of conductive fibres having a first end that is fixed to the support and a free second end that is opposite the first end and extends toward the turning part, and a conductive sleeve, having a radially inner surface located radially inwardly from a radially innermost surface of the turning race, the conductive sleeve comprising:

an annular base formed of an electrically conductive material, the annular base being fixed to the smaller diameter section of the turning part and axially abutting on the shoulder between the smaller diameter section and the larger diameter section of the turning part, and a conductive coating based on chromium nitride (CrN) covering at least partly a surface of the base facing the free second end of the plurality of conductive fibres of the earthing fibre brush so that the free second end of the plurality of conductive fibres is in sliding contact against the conductive coating based on chromium nitride.

2. The electrical machine according to claim 1, in which the conductive coating based on chromium nitride contains silver.

3. The electrical machine according to claim 1, wherein the annular base of the conductive sleeve comprises an annular ring fixed to the smaller diameter section of the turning part.

4. The electrical machine according to claim 3, wherein:
the annular ring comprises a sliding contact surface that contacts the free second end of the plurality of fibres of the earthing brush, and
the conductive coating based on chromium nitride is disposed at least on the sliding contact surface of the annular ring.

5. The electrical machine according to claim 4, wherein the conductive coating contains 30-40% chromium nitride.

6. The electrical machine according to claim 5, wherein the conductive coating further contains silver, has a thickness of 1-3 μm and a hardness of 15-20 GPa.

7. The electrical machine according to claim 6, wherein the sliding contact surface of the annular ring includes a circumferentially-extending, curved groove that contacts the free second end of the plurality of fibres.

8. The electrical machine according to claim 1, wherein the sliding contact surface of the annular ring includes a circumferentially-extending, curved groove that contacts the free second end of the plurality of fibres.

9. An electrical machine comprising:
a stationary part,
a turning part defining a longitudinal axis,
at least one bearing rotatably supporting the turning part, the bearing comprising a turning race fixed to the turning part and a stationary race fixed to the stationary part,
an earthing fibre brush comprising a support fixed to the stationary part or to the stationary race, and a plurality of conductive fibres having a first end that is fixed to the support and a free second end that is opposite the first end, and
a conductive sleeve, comprising:
an annular base formed of an electrically conductive material, the annular base being fixed to the turning race of the bearing, and
a conductive coating based on chromium nitride (CrN) covering at least partly a surface of the annular base that contacts the free second end of the plurality of conductive fibres of the earthing fibre brush so that the free second end of the plurality of conductive fibres is in sliding contact against the conductive coating based on chromium nitride, and
wherein the annular base of the conductive sleeve comprises an annular washer having a radially-extending surface that extends in a radial direction, which is perpendicular to the longitudinal axis, and contacts an axial end of the turning race of the bearing, and an axially-extending ring extending axially from a radially outer edge of the radially-extending surface of the washer, the axially-extending ring being in a tight fit on an axially-extending surface of the turning race of the bearing, the plurality of fibres extending at an angle relative to the longitudinal axis and to the radial direction, and the free second end of the plurality of fibres of the brush coming into sliding contact against the radially-extending surface of the annular washer.

10. The electrical machine according to claim 9, wherein the location at which the fibres are attached to the support is disposed axially forward of the location at which the fibres contact the radially-extending surface of the annular washer.

11. The electrical machine according to claim 10, wherein the conductive coating contains 30-40% chromium nitride.

12. The electrical machine according to claim 11, wherein the conductive coating further contains silver, has a thickness of 1-3 μm and a hardness of 15-20 GPa.

13. An electrical machine comprising:
a stationary part,
a turning part having a longitudinal axis,
at least one bearing rotatably supporting the turning part, the bearing comprising a turning race fixed to the turning part and a stationary race fixed to the stationary part,
an earthing fibre brush comprising a support fixed to the stationary part or to the stationary race, and a plurality of conductive fibres having a first end that is fixed to the support and a free second end that is opposite the first end which extends toward the turning part at an angle to the longitudinal axis and to a radial direction that is perpendicular to the longitudinal axis, and
a conductive sleeve having:
an annular base formed of an electrically conductive material, the annular base having an annular ring fixed to the turning part, a radial portion extending radially outward from the annular ring and contacting a radially-extending, axial-end surface of the bearing, and a curved portion connecting the annular ring and the radial portion, and
a conductive coating based on chromium nitride (CrN) covering at least partly a surface of the annular base that contacts the free second end of the conductive fibres of the earthing fibre brush so that the free second end of the fibres is in sliding contact against the coating based on chromium nitride.

14. The electrical machine according to claim 13, wherein the location at which the fibres are attached to the support is disposed axially forward of the location at which the fibres contact the annular base.

15. The electrical machine according to claim 14, wherein the fibres contact at least the curved portion of the annular base.

16. The electrical machine according to claim 15, wherein the fibres also contact the radial portion of the annular base.

17. The electrical machine according to claim 16, wherein the conductive coating contains 30-40% chromium nitride.

18. The electrical machine according to claim 17, wherein the conductive coating further contains silver, has a thickness of 1-3 μm and a hardness of 15-20 GPa.

* * * * *